US005610397A

United States Patent [19]

Kelley

[11] Patent Number: 5,610,397

[45] Date of Patent: *Mar. 11, 1997

[54] MASS SPECTROMETRY METHOD USING SUPPLEMENTAL AC VOLTAGE SIGNALS

[75] Inventor: Paul E. Kelley, San Jose, Calif.

[73] Assignee: Teledyne Electronic Technologies, Mountain View, Calif.

[ * ] Notice: The term of this patent shall not extend beyond the expiration date of Pat. No. 5,200,613.

[21] Appl. No.: 434,476

[22] Filed: May 4, 1995

Related U.S. Application Data

[63] Continuation of Ser. No. 326,062, Oct. 19, 1994, Pat. No. 5,508,516, which is a continuation of Ser. No. 34,170, Mar. 18, 1993, abandoned, which is a continuation of Ser. No. 884,455, May 14, 1992, Pat. No. 5,274,233, which is a continuation of Ser. No. 662,191, Feb. 28, 1991, abandoned.

[51] Int. Cl.⁶ .......... B01D 59/44; H01J 49/00

[52] U.S. Cl. .......... 250/282; 250/292

[58] Field of Search .......... 250/282, 292

[56] References Cited

U.S. PATENT DOCUMENTS

| | | | |
|---|---|---|---|
| 4,540,884 | 9/1985 | Stafford et al. | 250/282 |
| 4,736,101 | 4/1988 | Syka et al. | 250/292 |
| 4,749,860 | 6/1988 | Kelley et al. | 250/282 |
| 4,761,545 | 8/1988 | Marshall et al. | 250/291 |
| 4,771,172 | 9/1988 | Weber-Grabau et al. | 250/282 |
| 4,818,869 | 4/1989 | Weber-Grabau et al. | 250/282 |
| 4,882,484 | 11/1989 | Franzen et al. | 250/282 |
| 4,975,577 | 12/1990 | Franzen et al. | 250/291 |
| 5,075,547 | 12/1991 | Johnson et al. | 250/292 |
| 5,128,542 | 7/1992 | Yates et al. | 250/292 |
| 5,171,991 | 12/1992 | Johnson et al. | 250/292 |
| 5,200,613 | 4/1993 | Kelley | 250/292 |
| 5,206,507 | 4/1993 | Kelley | 250/292 |
| 5,274,233 | 12/1993 | Kelley | 250/292 |
| 5,285,063 | 2/1994 | Schwartz et al. | 250/292 |
| 5,352,890 | 10/1994 | Johnson et al. | 250/282 |
| 5,381,007 | 1/1995 | Kelley | 250/282 |

FOREIGN PATENT DOCUMENTS

| | | | |
|---|---|---|---|
| 180328 | 5/1986 | European Pat. Off. | H01J 49/42 |
| 383961 | 2/1988 | European Pat. Off. | H01J 49/42 |
| 336990 | 4/1988 | European Pat. Off. | H01J 49/42 |
| 362432 | 4/1990 | European Pat. Off. | H01J 49/42 |

OTHER PUBLICATIONS

Wang et al., "Extension of Dynamic Range in Fourier Transform Ion Cyclotron Resonance Mass Spectrometry Via Stored Waveform Inverse Fourier Transform Excitation," Anal. Chem., 1986, 5B pp. 2935–2938.

Dawson et al., "Non–Linear Resonances in Quadrupole Mass Spectrometers Due to Imperfect Fields, I. The Quadrupole Ion Trap," *International Journal of Mass Spectrometry and Ion Physics*, 2 (1969) pp. 45–59.

*Primary Examiner*—Bruce Anderson
*Attorney, Agent, or Firm*—Limbach & Limbach L.L.P.

[57] ABSTRACT

A mass spectrometry method in which one or more high power supplemental AC voltage signals and one or more low power supplemental AC voltage signals are applied to an ion trap. The frequency of each supplemental AC voltage is selected to match a resonance frequency of an ion having a desired mass-to-charge ratio. The low power supplemental voltage signals are applied for the purpose of dissociating specific ions (i.e., parent ions) within the trap, and the high power supplemental voltage signals are applied to resonate products of the dissociation process (i.e., daughter ions) so that they can be detected. In one class of embodiments, the high power voltage signals resonate daughter ions out from the trap for detection by an external detector. In another class of embodiments, each high power voltage signal resonates the daughter ions only to a degree sufficient for detection by an in-trap detector (which may comprise one or more of the electrodes which define the trapping field, or may be mounted integrally with such electrodes).

4 Claims, 3 Drawing Sheets

MASS SPECTROMETRY METHOD USING SUPPLEMENTAL AC VOLTAGE SIGNALS

This is a continuation of application Ser. No. 08/326,062, filed on Oct. 19, 1994 now U.S. Pat. No. 5,508,516, which is a continuation of U.S. application Ser. No. 08/034,170 filed on Mar. 18, 1993 now abandoned, which is a continuation of U.S. application Ser. No. 07/884,455, filed on May 14, 1992 (now issued as U.S. Pat. No. 5,274,233), which is a continuation of U.S. application Ser. No. 07/662,191, filed on Feb. 28, 1991 (now abandoned).

FIELD OF THE INVENTION

The invention relates to mass spectrometry methods in which parent ions within an ion trap are dissociated, and resulting daughter ions are caused to resonate so that they can be detected. More particularly, the invention is a mass spectrometry method in which supplemental AC voltage signals are applied to an ion trap to dissociate parent ions within the trap and to resonate resulting daughter ions for detection.

BACKGROUND OF THE INVENTION

In a class of conventional mass spectrometry techniques known as "MS/MS" methods, ions (known as "parent ions") having mass-to-charge ratio within a selected range are isolated in an ion trap. The trapped parent ions are then allowed, or induced, to dissociate (for example, by colliding with background gas molecules within the trap) to produce ions known as "daughter ions." The daughter ions are then ejected from the trap and detected.

For example, U.S. Pat. No. 4,736,101, issued Apr. 5, 1988, to Syka, et al., discloses an MS/MS method in which ions (having a mass-to-charge ratio within a predetermined range) are trapped within a three-dimensional quadrupole trapping field. The trapping field is then scanned to eject unwanted parent ions (ions other than parent ions having a desired mass-to-charge ratio) sequentially from the trap. The trapping field is then changed again to become capable of storing daughter ions of interest. The trapped parent ions are then induced to dissociate to produce daughter ions, and the daughter ions are ejected sequentially from the trap for detection.

In order to eject unwanted parent ions from the trap prior to parent ion dissociation, U.S. Pat. No. 4,736,101 teaches that the trapping field should be scanned by sweeping the amplitude of the fundamental voltage which defines the trapping field.

U.S. Pat. No. 4,736,101 also teaches that a supplemental AC field can be applied to the trap during the period in which the parent ions undergo dissociation, in order to promote the dissociation process (see column 5, lines 43–62), or to eject a particular ion from the trap so that the ejected ion will not be detected during subsequent ejection and detection of sample ions (see column 4, line 60, through column 5, line 6).

U.S. Pat. No. 4,736,101 also suggests (at column 5, lines 7–12) that a supplemental AC field could be applied to the trap during an initial ionization period, to eject a particular ion (especially an ion that would otherwise be present in large quantities) that would otherwise interfere with the study of other (less common) ions of interest.

However, conventional MS/MS methods are capable only of obtaining information of limited scope regarding each sample of interest. It would be desirable to obtain a broader range of information regarding a sample than can be obtained from conventional MS/MS methods. To minimize the time required to analyze a sample, and to maximize sample information, it would also be desirable to obtain such information in a manner in which daughter ions of interest are selectively resonated for detection. However, until the present invention, it was not known how to simultaneously achieve all these objectives in an ion trap.

SUMMARY OF THE INVENTION

The invention is a mass spectrometry method in which at least one high power supplemental AC voltage signal (having "high" power in the sense that its amplitude is sufficiently large to resonate a selected ion to a degree enabling detection of the ion) is applied to an ion trap, and at least one low power supplemental AC voltage signal (having "low" power in the sense that its amplitude is sufficient to induce dissociation of a selected ion, but insufficient to resonate the ion to a degree enabling it to be detected) is also applied to the ion trap. The frequency of each supplemental AC voltage signal is selected to match a resonance frequency of an ion having a desired mass-to-charge ratio. Each low power supplemental voltage signal is applied for the purpose of dissociating specific ions (i.e., parent ions) within the trap, and each high power supplemental voltage signal is applied to resonate products of the dissociation process (i.e., daughter ions) so that they can be detected.

In one class of embodiments, high power voltage signals resonate daughter ions out from the trap for detection by an external detector. In another class of embodiments employing an in-trap ion detector, each high power voltage signal need only resonate the daughter ions to a degree sufficient for detection within the trap by the in-trap detector (which may comprise one or more of the electrodes which define the trapping field, or may be mounted integrally with such an electrode).

DETAILED DESCRIPTION OF THE PREFERRED EMBODIMENTS

Figure 1:
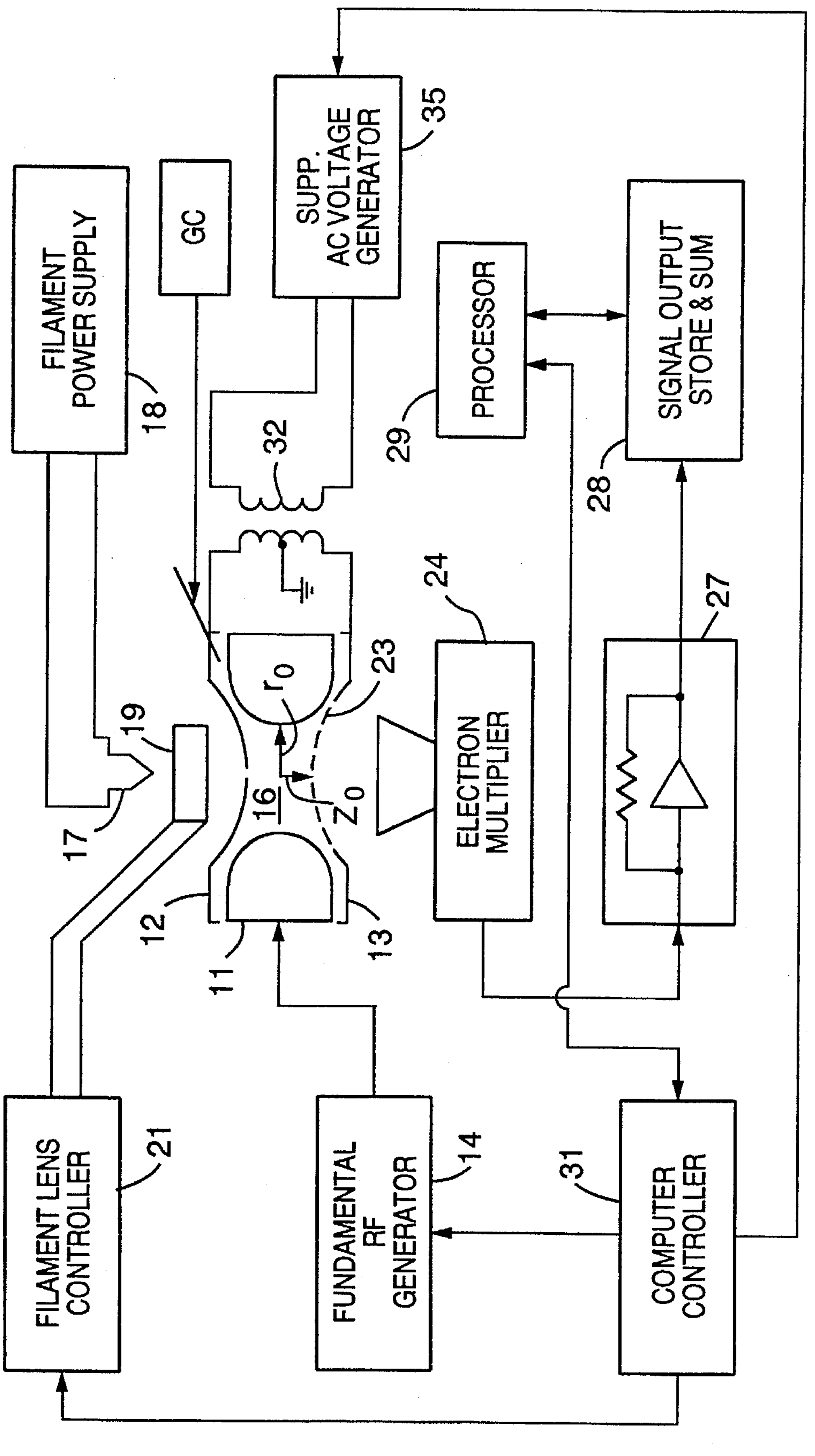
FIG. 1 is a simplified schematic diagram of an apparatus useful for implementing a class of preferred embodiments of the invention.

The quadrupole ion trap apparatus shown in FIG. 1 is useful for implementing a class of preferred embodiments of the invention. The FIG. 1 apparatus includes ring electrode 11 and end electrodes 12 and 13. A three-dimensional quadrupole trapping field is produced in region 16 enclosed by electrodes 11–13, when fundamental voltage generator 14 is switched on to apply a fundamental RF voltage (having a radio frequency component and optionally also a DC component) between electrode 11 and electrodes 12 and 13. Ion storage region 16 has radius $r_o$ and vertical dimension $z_o$. Electrodes 11, 12, and 13 are common mode grounded through coupling transformer 32.

Supplemental AC voltage generator 35 can be switched on to apply a desired supplemental AC voltage signal across end electrodes 12 and 13. The supplemental AC voltage signal is selected (in a manner to be explained below in detail) to resonate desired trapped ions at their axial resonance frequencies.

Filament 17, when powered by filament power supply 18, directs an ionizing electron beam into region 16 through an aperture in end electrode 12. The electron beam ionizes sample molecules within region 16, so that the resulting ions can be trapped within region 16 by the quadrupole trapping field. Cylindrical gate electrode and lens 19 is controlled by filament lens control circuit 21 to gate the electron beam off and on as desired.

In one embodiment, end electrode 13 has perforations 23 through which ions can be ejected from region 16 for detection by an externally positioned electron multiplier detector 24. Electrometer 27 receives the current signal asserted at the output of detector 24, and converts it to a voltage signal, which is summed and stored within circuit 28, for processing within processor 29.

In a variation on the FIG. 1 apparatus, perforations 23 are omitted, and an in-trap detector is substituted. Such an in-trap detector can comprise the trap's end electrodes themselves. For example, one or both of the end electrodes could be composed of (or partially composed of) phosphorescent material (which emits photons in response to incidence of ions at one of its surfaces). In another class of embodiments, the in-trap ion detector is distinct from the end electrodes, but is mounted integrally with one or both of them (so as to detect ions that strike the end electrodes without introducing significant distortions in the shape of the end electrode surfaces which face region 16). One example of this type of in-trap ion detector is a Faraday effect detector in which an electrically isolated conductive pin is mounted with its tip flush with an end electrode surface (preferably at a location along the z-axis in the center of end electrode 13). Alternatively, other kinds of in-trap ion detectors can be employed, such as ion detectors which do not require that ions directly strike them to be detected (examples of this latter type of detector include resonant power absorption detection means, and image current detection means). The output of each in-trap detector is supplied through appropriate detector electronics to processor 29.

Control circuit 31 generates control signals for controlling fundamental voltage generator 14, filament control circuit 21, and supplemental AC voltage generator 35. Circuit 31 sends control signals to circuits 14, 21, and 35 in response to commands it receives from processor 29, and sends data to processor 29 in response to requests from processor 29.

Figure 2:
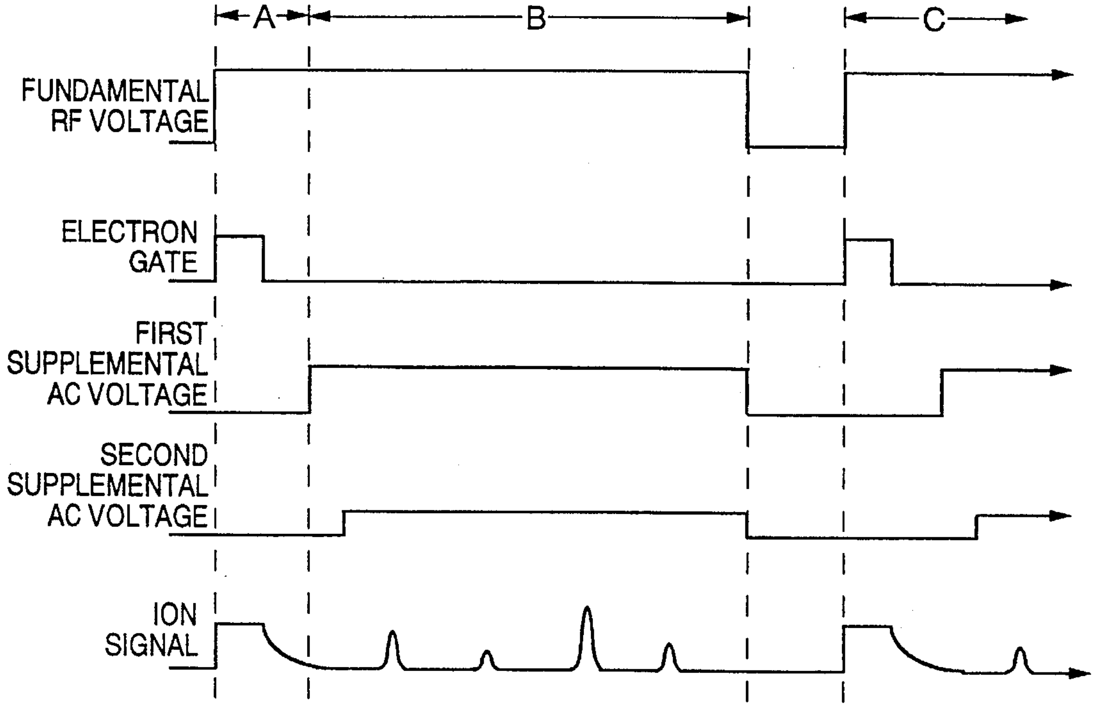
FIG. 2 is a diagram representing signals generated during performance of a first preferred embodiment of the invention.

A first preferred embodiment of the inventive method will next be described with reference to FIG. 2. As indicated in FIG. 2, the first step of this method (which occurs during period "A") is to store parent ions in a trap. This can be accomplished by applying a fundamental voltage signal to the trap (by activating generator 14 of the FIG. 1 apparatus) to establish a quadrupole trapping field, and introducing an ionizing electron beam into ion storage region 16. Alternatively, the parent ions can be externally produced and then injected into storage region 16.

The fundamental voltage signal is chosen so that the trapping field will store (within region 16) parent ions (for example, parent ions resulting from interactions between sample molecules and the ionizing electron beam) as well as daughter ions (which may be produced during period "B") having mass-to-charge ratio within a desired range. Other ions produced in the trap during period A which have mass-to-charge ratio outside the desired range will escape from region 16, possibly saturating detector 24 as they escape, as indicated by the value of the "ion signal" in FIG. 2 during period A.

Before the end of period A, the ionizing electron beam is gated off.

Then, during period B, a first supplemental AC voltage signal is applied to the trap (such as by activating generator 35 of the FIG. 1 apparatus). This voltage signal has a frequency selected to resonantly excite selected daughter ions, and has amplitude (and hence power) sufficiently large to resonate the resonantly excited daughter ions to a degree sufficient to enable them to be detected by an in-trap detector (or by a detector mounted outside the trap).

While generator 35 continues to apply the first supplemental AC voltage to the trap, generator 35 (or a second supplemental AC voltage generator connected to the appropriate electrode or electrodes) is caused to apply a second supplemental AC voltage signal to the trap. The power (output voltage applied) of the second supplemental AC signal is lower than that of the first supplemental voltage signal (typically, the power of the second supplemental signal is on the order of 100 mV while the power of the first supplemental signal is on the order of 1 V). The second supplemental AC voltage signal has a frequency selected to induce dissociation of a particular parent ion (to produce daughter ions therefrom), but has amplitude (and hence power) sufficiently low that it does not resonate significant numbers of the ions excited thereby out of the trap for detection (in embodiments employing an in-trap ion detection means, the second supplemental signal should have sufficient power to resonantly induce dissociation of selected parent ions, but should have sufficiently low power that it does not cause the trajectories of significant numbers of the ions it excites to become large enough for in-trap detection).

Next (also during period B), the frequency of the second supplemental AC signal is changed to induce dissociation of different parent ions. Each daughter ion produced during this frequency scan that happens to have a resonance frequency matching the frequency of the first supplemental signal will be resonated out of the trap for detection (or will be resonated sufficiently for detection by an in-trap detector comprising, or integrally mounted with, a trap electrode). Thus, for example, the "ion signal" portion shown within period B of FIG. 2 has four peaks, each representing detected daughter ions (having a common resonance frequency) resulting from sequential dissociation of four different types of parent ions.

An alternative way to induce dissociation of several different parent ions is to keep the frequency of the second supplemental AC signal fixed, but to change the trapping field parameters (i.e., one or more of the frequency or amplitude of the AC component of the fundamental RF voltage, or the amplitude of the DC component of the fundamental RF voltage). By so changing the trapping field, the frequency of each parent ion (the frequency at which each parent ion moves in the trapping field) is correspondingly changed, and the frequencies of different parent ions can be caused to match the frequency of the second supplemental AC signal. As the trapping field is so changed, the frequency of each daughter ion will also change, and thus, the frequency of the first supplemental AC signal should correspondingly be changed (so that at any instant, the first supplemental AC signal resonates the daughter ion of interest).

During the period which immediately follows period B, all voltage signal sources are switched off. The inventive method can then be repeated (i.e., during period C of FIG. 2).

In a variation on the FIG. 2 method, the first or the second supplemental AC voltage signal (or both of them) has two or more different frequency components within a selected frequency range. Each such frequency component should have frequency and amplitude characteristics of the type described above with reference to FIG. 2.

Figure 3:
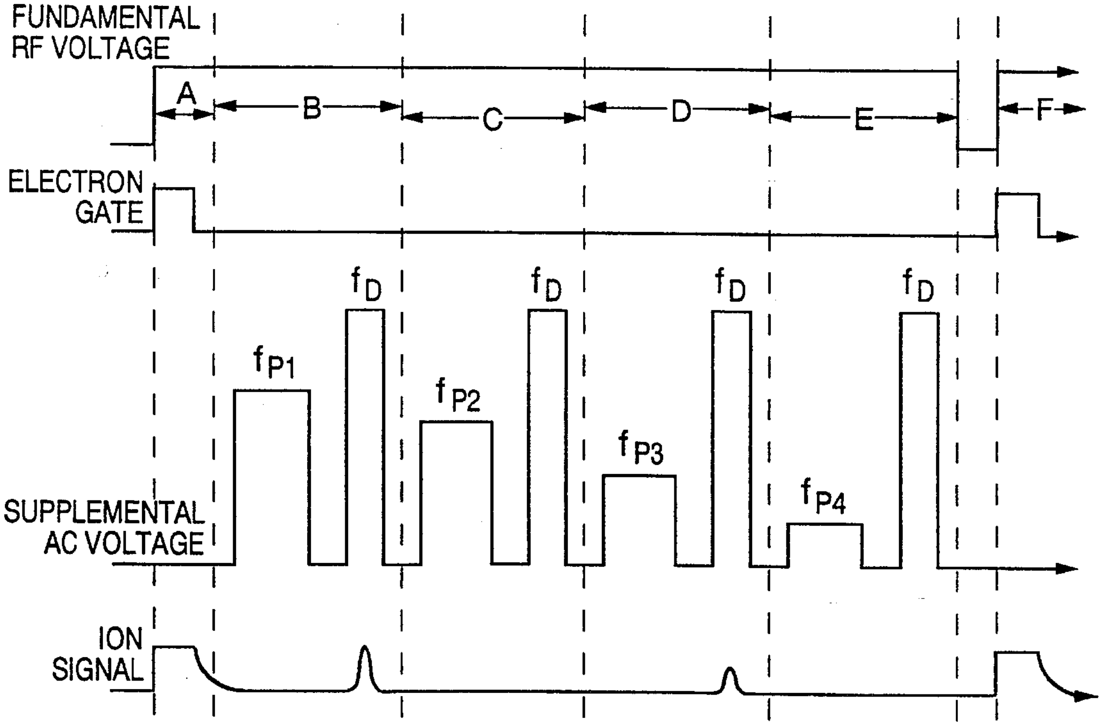
FIG. 3 is a diagram representing signals generated during performance of a second preferred embodiment of the invention.

Next, a second preferred embodiment of the invention will be described with reference to FIG. 3. As indicated in FIG. 3, the first step of this embodiment (which occurs during period "A") is to store parent ions in a trap. This can be accomplished by applying a fundamental voltage signal to the trap (by activating generator 14 of the FIG. 1 apparatus) to establish a quadrupole trapping field, and introducing an ionizing electron beam into ion storage region 16. Alternatively, the quadrupole trapping field is established and externally produced parent ions are injected into storage region 16.

The fundamental voltage signal is chosen so that the trapping field will store (within region 16) daughter ions (which may be produced within the trap after period A) as well as parent ions, all having mass-to-charge ratio within a desired range. Other ions (including ions resulting from interactions with the electron beam during period A), having mass-to-charge ratio outside the desired range, will escape from region 16 (possibly saturating detector 24 as they escape, as indicated by the value of the "ion signal" in FIG. 3 during period A).

Before the end of period A, the ionizing electron beam is gated off.

Then, during period B, a first supplemental AC voltage signal is applied to the trap (such as by activating generator 35 of the FIG. 1 apparatus). This voltage signal has a frequency ($f_{P1}$) selected to induce dissociation of a first parent ion (P1), but has amplitude (and hence power) sufficiently low that it does not resonate significant numbers of the ions excited thereby to a degree sufficient for in-trap or out-of-trap detection.

Next (also during period B), the first supplemental AC voltage signal is switched off, and a "daughter" supplemental AC voltage signal is applied to the trap to resonate daughters of the first parent ion out of the trap for detection (or to resonate them sufficiently to enable them to be detected by an in-trap detector). Thus, for example, the "ion signal" portion shown within period B of FIG. 3 has a peak representing detected daughter ions resulting from dissociation of the first parent ion during application of the first supplemental signal.

Rather than a single daughter supplemental AC voltage signal (as indicated within period B of FIG. 3), a set of two or more daughter supplemental AC voltage signals can be applied to the trap during period B. Each signal in this set should have a frequency selected to resonate a different daughter of the first parent ion for detection (by an in-trap or out-of-trap detector). An identical set of daughter supplemental AC voltage signals can be applied to the trap during each of periods C, D, and E (to be discussed below).

In general the frequency of each daughter ion will differ from the frequency of its parent ion. Thus, in one class of embodiments the frequency of each daughter supplemental AC voltage signal will differ from the frequency of the low power supplemental AC voltage signal (i.e., the "first" supplemental AC voltage signal mentioned above, or the "second," "third," or "fourth" supplemental AC voltage signal to be discussed with reference to periods "C," "D," and "E" of FIG. 3) applied to dissociate the parent of the daughter ion to be resonated by the daughter supplemental AC voltage signal.

However, it is also within the scope of the invention to change the trapping field parameters (i.e., one or more of the frequency or amplitude of the AC component of the fundamental RF voltage, or the amplitude of the DC component of the fundamental RF voltage) following application of the low power supplemental AC voltage signal and before application of the daughter supplemental AC voltage signal. By so changing the trapping field, the frequency of each daughter ion (the frequency at which each daughter ion moves in the trapping field) is correspondingly changed, and indeed the frequency of each daughter ion can be caused to match the frequency of the low power supplemental AC signal. In this latter case, both the daughter supplemental AC voltage signal and the low power supplemental AC voltage signal can have the same frequency (although these two supplemental AC voltage signals are applied to "different" trapping fields).

It is within the scope of the invention to perform only the steps described with reference to periods A and B of FIG. 3. Alternatively, additional steps to be described with reference to periods C, D, E, and F may be performed.

During period C (shown in FIG. 3), a second supplemental AC voltage signal is applied to the trap (such as by activating generator 35 of the FIG. 1 apparatus). This voltage signal has a different frequency ($f_{P2}$) selected to induce dissociation of a second parent ion (P2), but has amplitude sufficiently low that it does not resonate significant numbers of the ions excited thereby to a degree sufficient for in-trap or out-of-trap detection.

Next (also during period C), the second supplemental voltage signal is switched off, and the daughter supplemental AC voltage signal (or set of daughter supplemental AC voltage signals) is again applied to the trap to resonate daughters of the second parent ion for detection by an in-trap or out-of-trap detector. FIG. 3 reflects the possibility that no such daughter ions of interest will have been produced in response to application of the second supplemental signal. Thus, the ion signal portion shown within period C of FIG. 3 has no peak representing detected daughter ions produced by dissociation of second parent ions during application of the second supplemental signal.

During period D, a third supplemental AC voltage signal is applied to the trap (such as by activating generator 35 of the FIG. 1 apparatus). This voltage signal has a frequency ($f_{P3}$) selected to induce dissociation of a third parent ion (P3), but has amplitude (and hence power) sufficiently low that it does not resonate significant numbers of the ions excited thereby to a degree sufficient for in-trap or out-of-trap detection.

Next (also during period D), the third supplemental voltage signal is switched off, and the daughter supplemental AC voltage signal (or set of daughter supplemental AC voltage signals) is again applied to the trap to resonate daughters of the third parent ion for detection by an in-trap or out-of-trap detector. The "ion signal" portion shown within period D of FIG. 3 has a peak representing detected daughter ions resulting from dissociation of the third parent ions during application of the third supplemental signal.

Next, during period E, a fourth supplemental AC voltage signal is applied to the trap (such as by activating generator 35 of the FIG. 1 apparatus). This voltage signal has a different frequency ($f_{P4}$) selected to induce dissociation of a fourth parent ion (P4), but has amplitude sufficiently low that it does not resonate significant numbers of the ions it excites to a degree sufficient for them to be detected.

Next (also during period E), the fourth supplemental voltage signal is switched off, and the daughter supplemental AC voltage signal (or set of daughter supplemental AC voltage signals) is again applied to the trap to resonate daughters of the fourth parent ions out of the trap for detection (or to resonate them sufficiently for detection by an in-trap detector). FIG. 3 reflects the possibility that no such daughter ions will have been produced in response to application of the fourth supplemental signal. Thus, the ion signal portion shown within period E of FIG. 3 has no peak representing detected daughter ions.

During the period which immediately follows period E, all voltage signal sources are switched off. The inventive method can then be repeated (i.e., during period F of FIG. 3).

In variations on the FIG. 3 method, all or some of the supplemental AC voltage signals have two or more different frequency components within a selected frequency range. Each such frequency component should have frequency and amplitude characteristics of the type described above with reference to FIG. 3.

Figure 4:
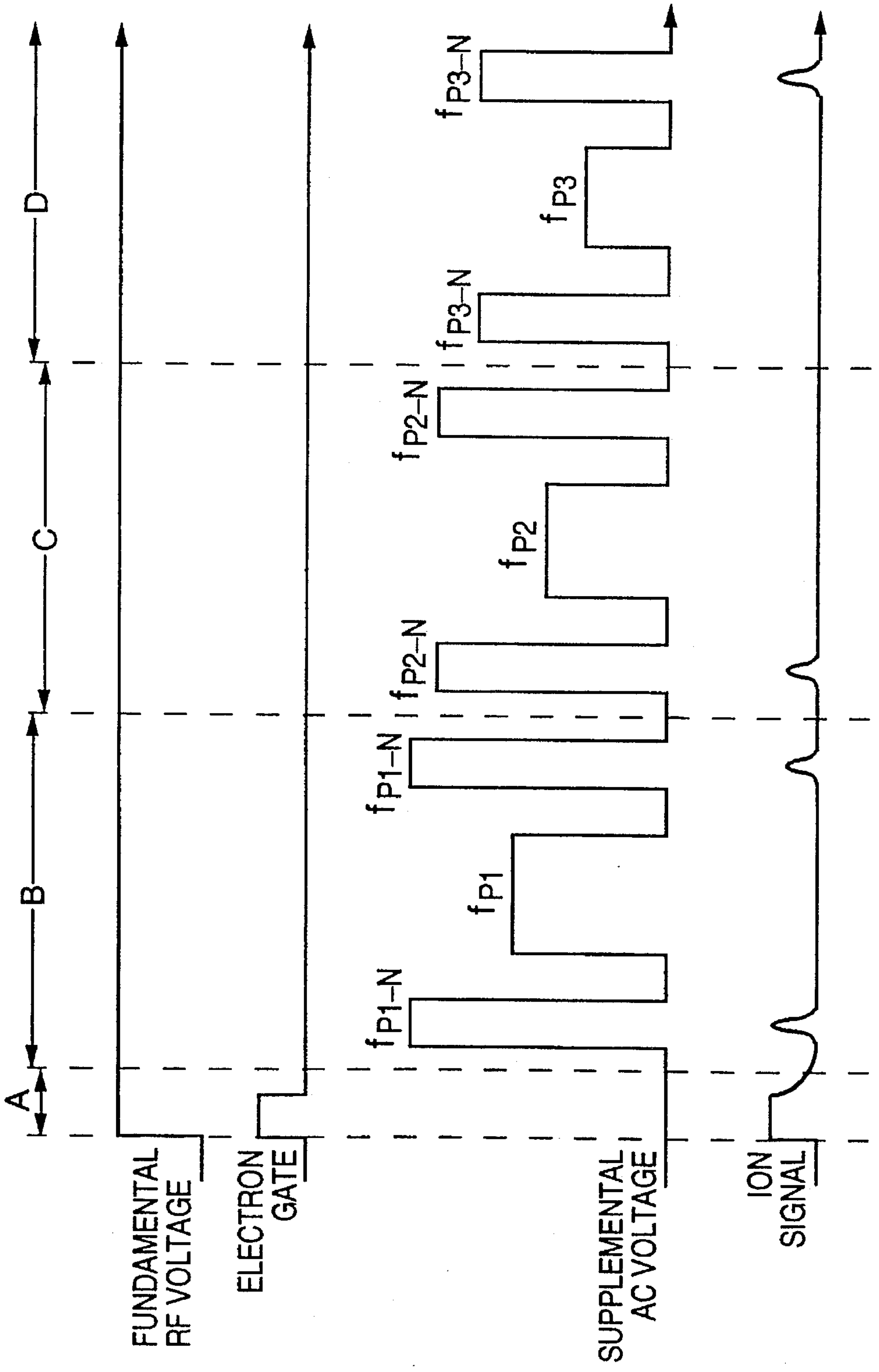
FIG. 4 is a diagram representing signals generated during performance of a third preferred embodiment of the invention.

A third preferred embodiment of the inventive method will next be described with reference to FIG. 4. As indicated in FIG. 4, the first step of this embodiment (which occurs during period "A") is to store parent ions in a trap. This can be accomplished by applying a fundamental voltage signal to the trap (by activating generator 14 of the FIG. 1 apparatus) to establish a quadrupole trapping field, and introducing an ionizing electron beam into ion storage region 16. Alternatively, the quadrupole trapping field is established and externally produced parent ions are injected into storage region 16.

The fundamental voltage signal is chosen so that the trapping field will store (within region 16) daughter ions (which may be produced within the trap after period A) as well as parent ions, all having mass-to-charge ratio within a desired range. Other ions (including ions resulting from interactions with the electron beam during period A), having mass-to-charge ratio outside the desired range, will escape from region 16 (possibly saturating detector 24 as they escape, as indicated by the value of the "ion signal" in FIG. 4 during period A).

Before the end of period A, the ionizing electron beam is gated off.

Then, during period B, a first supplemental AC voltage signal is applied to the trap (such as by activating generator 35 of the FIG. 1 apparatus). This voltage signal has a frequency ($f_{P1-N}$) selected to resonantly excite a first ion (having molecular weight P1-N), and has enough power (i.e., sufficient amplitude) to resonate the first ion to a degree enabling it to be detected (by an external detector or an in-trap detector).

The FIG. 4 method is particularly useful for analyzing "neutral loss" daughter ions. A neutral loss daughter ion results from dissociation of a parent ion into two components: a daughter molecule (for example, a water molecule) having zero (neutral) charge and a molecular weight N (N will sometimes be denoted herein as a "neutral loss mass"); and a neutral loss daughter ion having a molecular weight P-N, where P is the molecular weight of the parent ion. Thus, during period B of the FIG. 4 method, the first supplemental signal resonates ions having the same mass-to-charge ratio as do neutral loss daughter ions later produced during application of the second supplemental voltage signal (having frequency $f_{P1}$).

Next (also during period B), the first supplemental voltage signal is switched off, and a second supplemental AC voltage signal is applied to the trap. The second supplemental AC voltage signal has frequency selected to induce dissociation of a first parent ion having molecular mass P1. The power of the second supplemental AC signal is lower than that of the first supplemental voltage signal (typically, it is on the order of 100 mV, while the power of the first supplemental voltage signal is on the order of 1 V). The power of the second supplemental AC voltage signal is sufficiently low that this signal does not resonate significant numbers of the ions it excites to a degree sufficient for them to be detected.

Next (also during period B), a third supplemental AC signal is applied to the trap. The third supplemental AC signal has frequency ($f_{P1-N}$), and amplitude sufficient to resonate neutral loss daughter ions having molecular weight P1-N (produced earlier during period B during application of the second supplemental voltage signal) to a degree sufficient for in-trap or out-of-trap detection.

The ion signal portion present during period B of FIG. 4 has two peaks, which occur during application of the first and third supplemental voltage signals. The second peak can unambiguously be interpreted to represent neutral loss daughter ions produced during application of the second supplemental signal, even though the first peak cannot confidently be interpreted to represent neutral loss daughter ions resulting from dissociation of the first parent ion.

Next, during period C, fourth, fifth, and sixth supplemental AC voltage signals are sequentially applied to the trap, to enable detection of neutral loss daughter ions (having molecular weight P2-N) resulting from dissociation of a second parent ion (having molecular weight P2). The fourth and sixth supplemental voltage signals have frequency ($f_{P2-N}$) selected to resonantly excite a second ion (having molecular weight P2-N), and has enough power to resonate the second ion to a degree enabling it to be detected (by an external detector or an in-trap detector).

After application of the fourth supplemental voltage signal, this signal is switched off, and the fifth supplemental AC voltage signal is applied the trap. The fifth supplemental AC voltage signal has frequency selected to induce dissociation of a second parent ion having molecular mass P2. The power of the fifth supplemental AC signal is lower than that of the fourth and sixth supplemental voltage signals (typically, it is on the order of 100 mV), and is sufficiently low that the fifth supplemental signal does not resonate significant numbers of the ions it excites to a degree sufficient for them to be detected.

Next (also during period C), the sixth supplemental AC signal is applied to the trap. The sixth supplemental AC signal has frequency ($f_{P2-N}$), and amplitude sufficient to resonate neutral loss daughter ions having molecular weight P2-N (produced earlier during period C during application of the fourth supplemental voltage signal) to a degree enabling them to be detected.

FIG. 4 reflects the possibility that no such neutral daughter ions will have been produced in response to application of the fifth supplemental signal. Thus, the ion signal portion occurring during application of the sixth supplemental signal (within period C of FIG. 4) has no peak representing detected neutral loss daughter ions produced by dissociation of the second parent ion during application of the fifth supplemental signal, although the ion signal does have a peak representing sample ions detected during application of the fourth supplemental signal.

Finally, during period D, seventh, eighth, and ninth supplemental AC voltage signals are sequentially applied to the trap, to enable detection of neutral loss daughter ions (having molecular weight P3-N) resulting from dissociation of a third parent ion (having molecular weight P3). The seventh and ninth supplemental voltage signals have frequency ($f_{P3-N}$) selected to resonantly excite a third ion (having molecular weight P3-N), and each has enough power to resonate the third ion to a degree enabling it to be detected (by an external detector or an in-trap detector).

After application of the seventh supplemental voltage signal, this signal is switched off, and the eighth supplemental AC voltage signal is applied to the trap. The eighth supplemental AC voltage signal has frequency selected to induce dissociation of a third parent ion having molecular mass P3. The power of the eighth supplemental AC signal is lower than that of the seventh and ninth supplemental voltage signals (typically, it is on the order of 100 mV), and is sufficiently low that the eighth supplemental signal does not resonate significant numbers of the ions it excites to a degree sufficient for them to be detected.

Next (also during period D), the ninth supplemental AC signal is applied to the trap. The ninth supplemental AC signal has frequency ($f_{P3-N}$), and amplitude sufficient to resonate neutral loss daughter ions having molecular weight P3-N (produced during application of the seventh supplemental voltage signal) to a degree enabling them to be detected.

The ion signal portion occurring during application of the ninth supplemental signal (within period D of FIG. 4) has a peak representing detected neutral loss daughter ions produced by dissociation of the third parent ion during application of the eighth supplemental signal, although the ion signal has no peak representing ions detected during application of the seventh supplemental signal.

In one variation on the FIG. 4 method, only the operations described with reference to periods A and B are performed, to detect neutral loss daughter ions of only one parent ion. In other variations on the FIG. 4 method, additional sequences of operations are performed (each including steps corresponding to those described with reference to period B, C, or D), to detect neutral loss daughter ions of more than just three parent ions (as in the FIG. 4 embodiment).

In general, the frequency of each neutral loss daughter ion will differ from the frequency of its parent ion. Thus, in one class of embodiments the frequency of each high power supplemental AC voltage signal applied during one of periods "B," "C," or "D" of FIG. 4 will differ from the frequency of the low power supplemental AC voltage signal applied during the same period of FIG. 4. However, it is also within the scope of the FIG. 4 embodiment to change the trapping field parameters (i.e., one or more of the frequency or amplitude of the AC component of the fundamental RF voltage, or the amplitude of the DC component of the fundamental RF voltage) following application of each low power supplemental AC voltage signal and before application of the next high power supplemental AC voltage signal. By so changing the trapping field, the frequency of each neutral loss daughter ion (the frequency at which each neutral loss daughter ion moves in the trapping field) is correspondingly changed, and indeed the frequency of each neutral loss daughter ion can be caused to match the frequency of the low power supplemental AC signal. In this latter case, both the high power supplemental AC voltage signal and the low power supplemental AC voltage signal can have the same frequency (although these two supplemental AC voltage signals are applied to "different" trapping fields).

In another class of embodiments of the invention, granddaughter ions (in addition to daughter ions) are produced in ion region 16 and then detected (rather than daughter ions). For example, during step B in the FIG. 2 method, the second (low power) supplemental AC voltage signal can consist of an earlier portion followed by a later portion: the earlier portion having frequency selected to induce production of a daughter ion (by dissociating the parent ion); and the later portion having frequency selected to induce production of a granddaughter ion (by dissociating the daughter ion). In this example, the frequency of the first (high power) supplemental AC voltage signal applied in period B is selected to match a resonance frequency of the granddaughter ion (rather than the daughter ion).

For another example, during step B in the FIG. 3 method, the first (low power) supplemental AC voltage signal consists of an earlier portion followed by a later portion: the earlier portion having frequency selected to induce production of a daughter ion (by dissociating the first parent ion); and the later portion having frequency selected to induce production of a granddaughter ion (by dissociating the daughter ion). In this example, the frequency of the second (high power) supplemental AC voltage signal applied in period B is selected to match a resonance frequency of the granddaughter ion (rather than the daughter ion).

In the claims, the phrase "daughter ion" is intended to denote granddaughter ions (second generation daughter ions) and subsequent (third or later) generation daughter ions, as well as "first generation" daughter ions.

In a variation on the embodiment of the invention described with reference to FIG. 3, at least one of the "daughter" supplemental AC voltage signals (or sets of "daughter" supplemental AC voltage signals) is applied twice: once immediately prior to one of the first, second, third, or fourth (low power) supplemental AC voltage signals, and again immediately after the same one of the first, second, third, or fourth (low power) supplemental AC voltage signals. The purpose of each such "preliminary" application of the daughter signal (or set of signals) is to resonate ions having the same mass-to-charge ratio as do daughter ions to be produced later during application of the immediately following low power supplemental voltage signal (as in the embodiment of the invention described with reference to FIG. 4).

Various other modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A mass spectrometry method, including the steps of:

(a) establishing a three-dimensional trapping field capable of storing ions having mass-to-charge ratio within a selected range in a three-dimensional trap volume bounded by a set of electrodes;

(b) generating a signal comprising at least two different frequency components, said signal comprising a sufficient number of said frequency components to be capable of resonating out of the trap volume unwanted ions having mass-to-charge ratios within at least a portion of said range; and (c) while maintaining the three-dimensional trapping field substantially unchanged, applying the signal to at least one of the electrodes with sufficient amplitude so that the signal resonates out of the trap volume at least two species of unwanted ions having at least two different mass-to-charge ratios within said portion of said range.

2. The method of claim 1, wherein said amplitude is on the order of 1 volt.

3. A mass spectrometry method, including the steps of:

(a) establishing a three-dimensional trapping field capable of storing ions having mass-to-charge ratio within a selected range in a three-dimensional trap volume bounded by a set of electrodes;

(b) generating a signal comprising at least two different frequency components, said signal comprising a sufficient number of said frequency components to be capable of inducing dissociation of at least two species of ions having at least two different mass-to-charge ratios within at least a portion of said range; and (c) while maintaining the three-dimensional trapping field substantially unchanged, applying the signal to at least one of the electrodes with sufficient amplitude so that the signal induces dissociation of trapped ions but does not resonate said trapped ions out of the trap volume, where each of the trapped ions has one of said mass-to-charge ratios within said portion of said range, and each of the trapped ions is stably trapped in the three-dimensional trap volume.

4. The method of claim 3, wherein said amplitude is on the order of 100 millivolts.

* * * * *